Patented Apr. 21, 1936

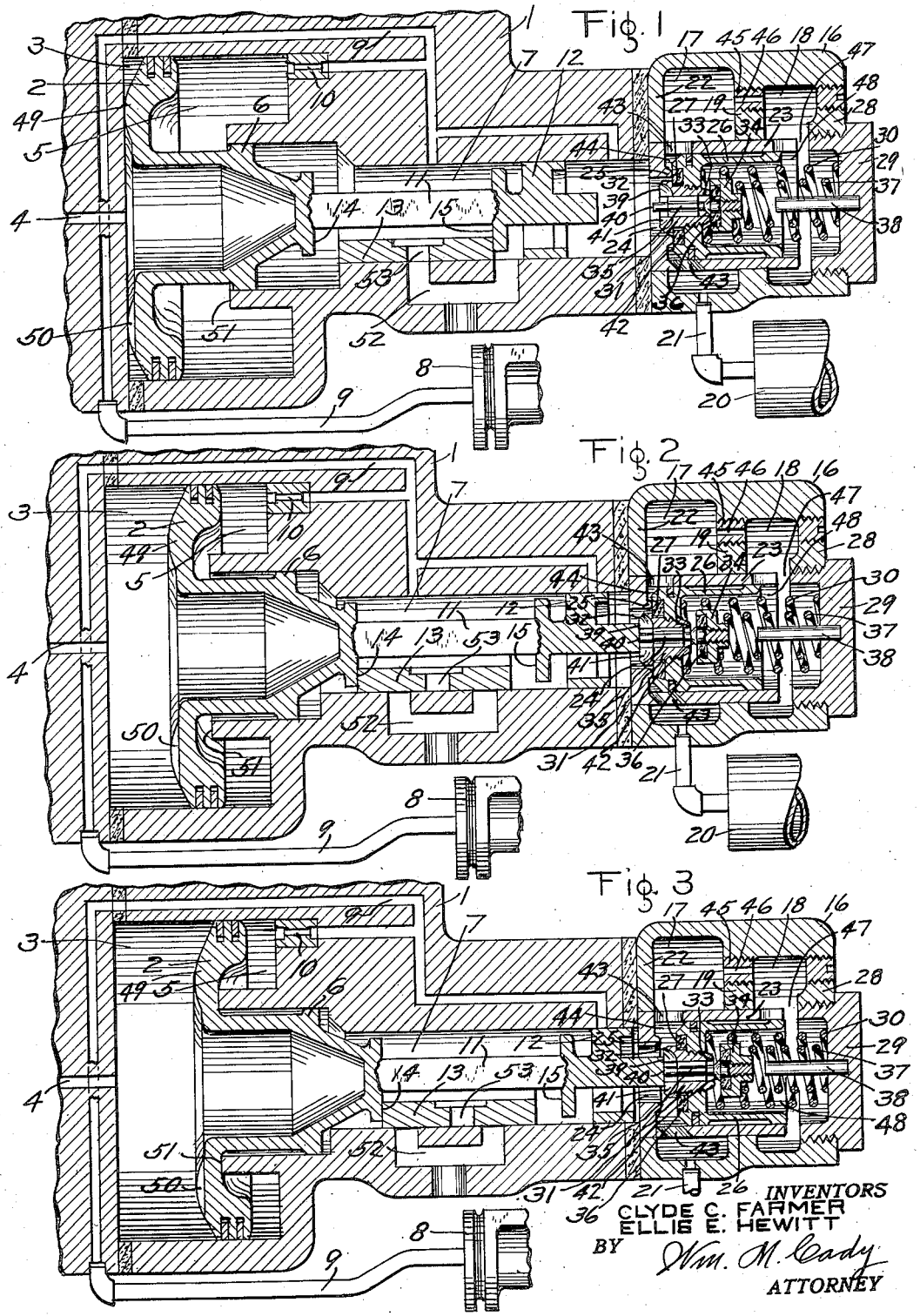

2,038,167

UNITED STATES PATENT OFFICE 2,038,167

BRAKE CONTROLLING VALVE DEVICE

Clyde C. Farmer, Pittsburgh, and Ellis E. Hewitt, Edgewood, Pa., assignors to The Westinghouse Air Brake Company, Wilmerding, Pa., a corporation of Pennsylvania Original application June 24, 1932, Serial No. 619,052. Divided and this application October 13, 1933, Serial No. 693,456

2 Claims. (Cl. 137—139)

This invention relates to fluid pressure brakes, and more particularly to a fluid pressure controlled valve device for applying and releasing the brakes, the present application being a division of our application, Serial No. 619,052, filed June 24, 1932, and which was issued July 30, 1935 as Patent No. 2,009,840.

The distributing valve device employed in the usual locomotive brake equipment comprises an application portion operative by an increase in fluid pressure to apply the brakes on a locomotive, and operative upon a reduction in fluid pressure to release the locomotive brakes, and further comprises an equalizing portion, which is similar to a triple valve device, and which responds to variations in brake pipe pressure to vary the controlling pressure in the application portion.

The application portion of the distributing valve device comprises an application piston having at one side a control chamber in which the pressure of fluid is varied by the operation of the equalizing portion, and having at the opposite side a chamber which is at all times open to the locomotive brake cylinder. The application portion further comprises an exhaust valve in the brake cylinder chamber for releasing fluid under pressure from the locomotive brake cylinder, and a supply or application valve in a chamber offset from the brake cylinder chamber and operative to supply fluid under pressure to the brake cylinder chamber and thereby to the locomotive brake cylinder for applying the locomotive brakes, both the exhaust valve and application valve being movable by the application piston.

The application valve is of the slide type and at all times subject to main reservoir pressure which presses it to its seat, so that said valve offers high resistance to movement. In order to overcome this resistance, it is necessary to provide a high differential of pressures on the application piston by operation of the equalizing portion. It requires time to obtain this high differential, and in applying the brakes, particularly in effecting a partial or graduated application, the degree of pressure obtained in the brake cylinder usually exceeds the actuating pressure applied to the application piston by a degree substantially equal to the differential of pressures required to move the application valve. It will therefore be evident that, with this type of construction, it is practically impossible to obtain quick response of the locomotive brakes, and to control the degree of pressure obtained in the locomotive brake cylinder with any great degree of accuracy, and further, in effecting a graduated application of the brakes, it is impossible to increase the brake cylinder pressure in as fine steps or increments, as is, at times, desired.

One object of our invention is to provide an improved application valve device, for a distributing valve device or the like, which is operative by slight changes in pressure differential on the application piston.

This object is attained by providing an application valve of the poppet type, instead of the slide type. This poppet valve is normally pressed into engagement with its seat by main reservoir pressure and the pressure of a spring, and is adapted to be moved away from its seat by the application piston. According to the invention, a small pilot valve is provided which is operative by the application piston in advance of the unseating of the application valve by said piston, for reducing the pressure, acting to seat the application valve, to a degree where only a slight differential of pressures on the application piston will unseat said application valve. According to this construction, the application portion of the distributing valve device will be responsive to slight changes in the control or actuating pressure to produce corresponding slight changes in pressure in the locomotive brake cylinder.

Another object of our invention is to provide improved means for maintaining the pressure in the brake cylinder against leakage, at substantially the control or actuating pressure applied to the application piston.

According to the last mentioned object, the pilot valve above referred to, is operative to supply fluid under pressure to the locomotive brake cylinder at a rate sufficient to maintain the pressure in the brake cylinder against leakage, the pilot valve being operative by only a slight differential of pressures on the application piston, so that the brake cylinder pressure will be maintained at substantially the control pressure applied to said piston.

Other objects and advantages will appear in the following more detailed description of our invention.

In the accompanying drawing; Fig. 1 is a diagrammatic, sectional view of the application portion of a distributing valve device embodying our improved application valve device and showing the parts in release position; Fig. 2 is a diagrammatic, sectional view similar to Fig. 1 but showing the parts of the application portion in another position; and Fig. 3 is a diagrammatic, sectional view similar to Fig. 1 but showing the parts of the application portion in still another position.

As shown in the drawing, the application portion of the distributing valve device comprises a casing 1 containing an application piston 2 having at one side a control chamber 3 connected to a passage 4 leading to the equalizing portion (not shown) of the distributing valve device, and having at the opposite side a chamber 5. A baffle piston 6 is associated with the application piston 2 and is slidably mounted in a suitable bore in the casing 1 and separates chamber 5 from a valve chamber 7 which is connected to a brake cylinder 8 through a passage and pipe 9, chamber 5 being connected to the brake cylinder passage 9 through a choked passage 10.

The application piston 2 is provided with a stem 11 which projects into the valve chamber 7, the end of said piston stem being provided with an apertured enlargement forming a guide 12 slidably engaging the wall of chamber 7.

A brake cylinder release valve 13 is slidably mounted on a seat provided in the casing within chamber 7 for controlling communication from chamber 7 to the atmosphere, and spaced shoulders 14 and 15 are provided on the application piston stem 11 for shifting said valve upon its seat.

The outer end of the application piston stem 11 is adapted to operate an application valve device 16.

The application valve device 16 comprises a casing secured to casing 1 and having two chambers 17 and 18 separated by a partition wall 19. The chamber 17, which is connected to a main reservoir 20 through a pipe 21, has a wall 22 through which is provided a bore in axial alignment with the longitudinal axis of the release valve chamber 7, and pressed into said bore and an axial bore in the partition wall 19 is a bushing 23 which seals communication through the bore in said partition wall, and which preferably extends through the wall 22 so as to be flush with the outer surface thereof.

The bore through bushing 23 is freely open at one end to chamber 18 and is closed in at the opposite end to provide a passageway 24 leading to valve chamber 7. An annular seat rib 25 is provided on the inside of the bushing 23 around the passageway 24.

An application valve piston 26 is slidably mounted in the bushing 23 and carries at one end a gasket 27 adapted to engage and seal against the rib 25. The outer wall 28 of chamber 18 is provided with an opening through which the application valve piston 26 is adapted to be inserted into and removed from the bushing 23, said opening being closed by a nut 29 having screw-threaded engagement in said wall. A spring 30 is interposed between the nut 29 and the application valve piston 26 for urging said valve piston to the position in which the gasket 27 seals against seat rib 25.

An axial bore is provided through the head of the application valve piston 26 and secured in said bore by screw-threaded engagement, is a member 31 having a shoulder 32 engaging the gasket 27 for holding said gasket in position.

The member 31 is provided with an axial bore and extends through the head of the application valve piston 26 to provide on the right hand side thereof an annular seat rib 33 surrounding said bore. A pilot valve 34, having a fluted stem 35 slidably extending through the bore in member 31, is provided with a gasket 36 adapted to engage and seal against the seat rib 33, and a spring 37, contained within spring 30, is interposed between the pilot valve 34 and cap nut 29 for urging the gasket 36 on said valve into engagement with seat rib 33. A pin 38 is carried by the cap nut 29 and extends within the spring 37 for maintaining said spring in alignment with the pivot valve 34.

The flutes on the stem 35 of the pilot valve 34 terminate short of the outer face 39 of member 31, into an operating pin 40 which projects beyond the face 39 of said member but is of such length that the end lies entirely within the passageway 24 when the valve piston 26 is in engagement with the seat rib 25, as shown in Fig. 1 of the drawing. A slot 41 is provided in member 31 across the face 39, the length of said slot being greater than the diameter of the end of the application piston stem 11.

The flutes on the pilot valve stem 35 also terminate short of the gasket 36, and adjacent said gasket, said stem is provided with a cone-shaped portion 42 which extends into the bore containing said stem, when said gasket engages the seat rib 33.

The bushing 23 is provided adjacent the left hand end with a plurality of through openings 43 connecting the main reservoir chamber 17 to a chamber 44 formed at the left hand side of the valve piston 26, outside of the seat rib 25.

A choke plug 45 is screw-threaded into the partition wall 19 and is provided with a restricted passage 46 through which communication is established from chamber 17 to chamber 18, the flow capacity of said choked passage having a predetermined relation to the venting capacity of the pilot valve 34, as will be hereinafter described. Clearance space 47 is provided between the end of bushing 23 and cap nut 29 to permit free flow of fluid under pressure from chamber 18 to chamber 48 at the right hand side of the valve piston 26.

The application piston 2 is provided with a release position, which is shown in Fig. 1 and which is defined by engagement of a stop rib 49, provided on the left hand face of said piston, with the wall of chamber 3. A slot 50 is provided through the rib 49 to connect the chambers formed at the two sides of said rib when said piston is in engagement with the left hand wall of chamber 3. The application piston 2 is also provided with a full application position which is defined by the engagement of the right hand side of said piston with a stop rib 51 provided on the casing, as shown in Fig. 3.

In operation, if it is desired to effect an application of the locomotive brakes, fluid under pressure is supplied through passage 4 to the application piston chamber 3 in the usual manner, and the pressure of fluid thus applied to the piston 2 moves said piston towards the right hand. This movement of the application piston 2 is relative to the release valve 13 until shoulder 14 on the piston stem 11 engages said valve and then said piston moves said valve toward the right hand so as to lap the usual release passage 52.

After the release passage 52 is lapped, the continued movement of the application piston 2 moves the end of the piston stem 11 into the passageway 24 into operating engagement with the end of the pilot valve stem 40 and then moves the pilot valve 34 away from the seat rib 33 against the opposing pressure of the light seating spring 37.

The amount that the pilot valve 34 is unseated by the application piston 2 is limited by the engagement of the end of the piston stem 11 with the face 39 of the member 31, as shown in Fig. 2, and in this position of the pilot valve, fluid under pressure is vented from the chambers 48 and 18 past the pilot valve stem 35 and through the slot 41 to the brake cylinder chamber 7. The rate of this venting past the pilot valve 34 exceeds the rate at which fluid under pressure is supplied from the main reservoir chamber 17 through restricted passage 46 to the chambers 18 and 48 by an amount such as to reduce the pressure in chamber 48 to a degree where the combined pressures of spring 30 and fluid in chamber 48 acting to hold the valve piston 26 seated just slightly exceeds the main reservoir pressure acting on the opposite side of said valve piston outside of the seat rib 25. After the pressure of fluid acting to hold the application valve 34 seated is thus reduced, a slight increase in the actuating pressure in chamber 3 on the application piston 2, overcomes the reduced seating pressure on the application valve 26 and moves said valve away from the seat rib 25. With the application valve 26 thus unseated, fluid supplied from the main reservoir 20 to chamber 17 flows through the openings 43 in bushing 23 to chamber 44, then past the unseated application valve 26, and through passageway 24 to chamber 7 and from thence through passage and pipe 9 to the brake cylinder 8, thereby applying the locomotive brakes.

Under certain conditions, the supply of fluid past the application valve 26 to chamber 7 may be so rapid as to produce, momentarily, a pressure in chamber 7 exceeding the actuating or control pressure in chamber 3. It would be undesirable to permit this high pressure to act in chamber 5 on the right hand side of the application piston since it would tend to cause movement of said piston toward the left hand and thereby permit the application valve 26 to close until the pressure in chamber 7 becomes reduced by flow to the brake cylinder to below the actuating pressure applied to the application piston, at which time said piston would again operate to unseat the application valve. In order to prevent the alternate opening and closing of the application valve 26, and thereby provide a continuous increase in pressure in valve chamber 7 and consequently in the brake cylinder 8, the rapid flow of fluid from chamber 7 to chamber 5 is prevented by the baffle piston 6, and the supply of fluid to chamber 5 is restricted to leakage past the baffle piston and to the flow capacity of the choked passage 10. By thus restricting the supply of fluid to chamber 5, the increase in pressure in said chamber is held slightly behind the increase in actuating pressure in chamber 3, so that as long as fluid under pressure is being supplied to chamber 3, the application piston 2 is permitted to maintain the application valve 26 unseated.

If the degree of actuating or control pressure applied in chamber 3 to the application piston 2 is less than the pressure carried in the main reservoir 8, then when the pressure acting to move the application piston toward the left hand is increased to a degree slightly exceeding the control pressure acting in chamber 3, the application piston is moved toward the left hand and permits spring 30 to seat the application valve 26 and thereby close communication past said valve through which fluid is supplied from the main reservoir 20 to the brake cylinder 8. The pressure of spring 30 being thus removed from the application piston 2, said piston may momentarily stop its movement towards lap position upon seating of application valve 26, but in this position, fluid continues to flow from the main reservoir to the brake cylinder past the unseated pilot valve 34 until the brake cylinder pressure is increased to a degree where the pressures acting to move the application piston 2 against the control pressure in chamber 3 again slightly exceed the control pressure, at which time the application piston 2 is again moved toward the left hand until the pilot valve 34 seats. The seating of the pilot valve 34 removes the pressure of spring 37 from the application piston 2 so that further movement of said piston ceases in what is called lap position.

If less than a full application of brakes is effected as just described, then in order to increase the degree of application, the pressure of fluid in the application piston chamber 3 is increased and causes the application piston 2 to again operate the pilot valve 34 and application valve 26 to effect a substantially corresponding increase in pressure in the brake cylinder 8. In this manner, the brake cylinder pressure may be increased in steps, the fineness of the steps depending upon the differential of pressures required on the application piston to unseat the pilot valve 34.

In case there is leakage of fluid under pressure from the brake cylinder, the application piston 2 does not move from the application position fully to lap position, but instead, moves toward lap position only until the supply of fluid past the pilot valve 34 to the brake cylinder 8 is throttled to a degree which will maintain the brake cylinder pressure, against leakage, substantially equal to the control pressure acting in chamber 3 on said piston. This throttling of the supply of fluid past the pilot valve 34 to the brake cylinder 8 is effected by the cone-shaped portion 42 on the pilot valve stem entering the bore containing said stem, so as to gradually reduce the area of opening through which fluid under pressure is supplied from the control chamber to the receiving chamber as the pilot valve moves towards its seat. Due to the tapered or cone-shaped portion 42 on the pilot valve stem, the throttling action occurs through a considerable range of movement of the application piston 2 and therefore is very accurately controlled by said application piston.

In order to effect a release of the brakes after an application, fluid under pressure is vented from the application piston chamber 3, which permits the pressure of fluid acting in chambers 5 and 7 at the opposite side of the application piston 2 and baffle piston 6 to move said pistons to release position, as shown in Fig. 1. This movement of the application piston 2 to release position pulls the piston stem 11 away from the pilot valve stem 35 and then moves the release valve 13 to release position in which fluid is vented from the brake cylinder 8 through passage and pipe 9, valve chamber 7, through a port 53 in the release valve and past the end of said valve to the release passage 52 and from thence to the atmosphere.

It will now be noted that according to our invention we provide a small pilot valve within the application valve, the small pilot valve being operative by a slight differential of pressures on the relatively large application piston to reduce the seating pressure on the application valve to a degree at which only a slight increase in the differential of pressures on the application piston will unseat the application valve to effect an application of the brakes. The application valve being thus operative by a slight differential of pressures on the application piston permits of a fine control of the pressure in the locomotive brake cylinder and permits obtaining pressures in the brake cylinder corresponding substantially to the control or actuating pressure applied to the application piston. The supply of fluid from the main reservoir to the pilot valve side of the application valve is restricted to permit accomplishment of the above result, but still, is at a sufficiently fast rate to permit maintenance of brake cylinder pressure against leakage, which is effected by operation of the pilot valve, a tapered or cone-shaped portion being provided on the pilot valve stem to provide for a fine adjustment of the flow of fluid past the pilot valve in the case of maintaining brake cylinder pressure against leakage.

While one illustrative embodiment of our invention has been described in detail, it is not our intention to limit its scope to that embodiment or otherwise than by the terms of the appended claims.

Having now described our invention, what we claim as new and desire to secure by Letters Patents, is:

1. The combination with a main casing having a chamber open at one end and adapted to receive fluid under pressure, and a movable member disposed in such receiving chamber, of a valve device for supplying fluid under pressure to said receiving chamber and comprising a casing section adapted to be removably secured to said main casing closing the open end of said receiving chamber, a bushing disposed in said casing section having a wall and a passageway through said wall leading to said receiving chamber, a valve piston slidably mounted in said bushing and forming at the side adjacent said passageway a chamber supplied with fluid under pressure and at the opposite side a control chamber open to the fluid pressure supply chamber through a restricted passage, said valve piston being operative to control communication from said fluid pressure supply chamber to said passageway and thereby to said receiving chamber, said valve piston having an axial bore, a pilot valve in said control chamber for controlling communication therefrom to said bore and thereby said receiving chamber, a fluted stem carrying said pilot valve and slidably extending through said bore into said passageway to a position slightly beyond said side of said valve piston when said pilot valve is seated, said movable member being adapted upon movement in one direction to first engage said fluted stem and unseat said pilot valve and then engage said side of said valve piston and unseat said valve piston, said casing section having an opening at the control chamber side of said valve piston for application and removal of said valve piston and pilot valve to and from said casing section, a cap closing said opening, a spring interposed between said cap and valve piston for urging said valve piston to close communication through said passageway, and a spring interposed between said cap and pilot valve for urging said pilot valve to close communication through said bore.

2. The combination with a main casing having a chamber open at one end and adapted to receive fluid under pressure, and a movable member disposed in such receiving chamber, of a valve device for supplying fluid under pressure to said receiving chamber and comprising a casing section adapted to be removably secured to said main casing closing the open end of said receiving chamber, and having a through bore open at one end to said receiving chamber, a removable cap closing the other end of said bore, a bushing disposed in said bore and having in one end a wall flush with the face of the casing section adjacent the main casing, said wall having a passageway leading to said receiving chamber, said bushing forming exteriorly a fluid pressure supply chamber and extending into a control chamber communicating with the fluid pressure supply chamber through a restricted passage, said bushing having an opening through the side wall adjacent said end wall leading to said supply chamber, a valve piston slidably mounted in said bushing and subject on one side to the fluid pressure in said control chamber and on the opposite side to the fluid pressure in said supply chamber as supplied through the opening in the side wall of said bushing, said valve piston being movable into engagement with the end wall of said bushing for closing communication through said passageway, a spring disposed in said control chamber between said cap and valve piston for urging said valve piston to the position for closing said communication, said valve piston having an axial bore establishing communication from said control chamber to said passageway, a pilot valve disposed at the control chamber side of said valve piston for closing communication through said bore, a stem carrying said pilot valve and slidably extending through said bore beyond the face of said valve piston into said passageway but terminating in said passageway when said valve piston is in engagement with the end wall of said bushing, and a spring disposed in said control chamber between said cap and pilot valve urging said pilot valve to close communication through said bore, the movable member in said receiving chamber being movable into said passageway into engagement first with said stem for unseating said pilot valve and then said valve piston for unseating said valve piston and movable out of said passageway out of engagement first with said valve piston and then said pilot valve.

CLYDE C. FARMER.
ELLIS E. HEWITT.